United States Patent [19]

Endo et al.

[11] 4,446,901

[45] May 8, 1984

[54] HEAVY DUTY PNEUMATIC RADIAL TIRES

[75] Inventors: Kazuyuki Endo, Higashimurayama; Shigeo Makino, Tokorozawa, both of Japan

[73] Assignee: Bridgestone Tire Company Limited, Tokyo, Japan

[21] Appl. No.: 374,664

[22] Filed: May 4, 1982

[30] Foreign Application Priority Data

May 13, 1981 [JP] Japan ................................ 56-71945
Jul. 31, 1981 [JP] Japan ............................... 56-119286

[51] Int. Cl.$^3$ .............................................. B60C 11/06
[52] U.S. Cl. ............................................. 152/209 R
[58] Field of Search ..................... 152/208 R, 208 D; D12/142, 143

[56] References Cited

U.S. PATENT DOCUMENTS

| | | | |
|---|---|---|---|
| 2,756,797 | 7/1956 | Campbell | 152/209 R |
| 3,664,402 | 5/1972 | Montagne | 152/209 R |
| 3,763,911 | 10/1973 | Montagne | 152/209 R |
| 4,271,885 | 6/1981 | Takigawa et al. | 152/209 D |

Primary Examiner—Michael W. Ball
Attorney, Agent, or Firm—Sughrue, Mion, Zinn, Macpeak and Seas

[57] ABSTRACT

A heavy duty pneumatic radial tire comprises a carcass of a substantially radial construction composed of at least one rubberized ply layer containing cords embedded therein and a belt superimposed about said carcass for stiff reinforcement beneath a tread and composed of at least two rubberized ply layers each containing metal cords embedded therein, said metal cords of which being crossed with each other at a relatively small angle with respect to the circumferential direction of tire, and said tread being provided with a plurality of continuous or discontinuous zigzag circumferential ribs defined along the widthwise direction of tire by at least three, substantially zigzag main grooves extending circumferentially of said tread, said main grooves comprising one or a pair of central circumferential grooves located at a substantially central region of said tread and a pair of outside circumferential grooves defining each of outermost ribs of said tread. In this tire, the central circumferential groove has such a symmetrical cross-sectional shape with respect to a center line of said groove that an inclination angle of a groove wall of said groove with respect to a normal line drawn from an outer surface of said tread and passing an edge of said groove in the cross section perpendicular to said groove wall is made relatively large in a region extending from the groove bottom to at least 50% of groove depth, and the outside circumferential groove has such an unsymmetrical cross-sectional shape with respect to a center line of said groove that an inclination angle of an outer groove wall of said groove in the rotation axial direction of tire is made relatively large and an inclination angle of an inner groove wall of said groove in a region extending from the outer surface of said tread to at least 10% of groove depth is made smaller than that of said outer groove wall.

14 Claims, 12 Drawing Figures

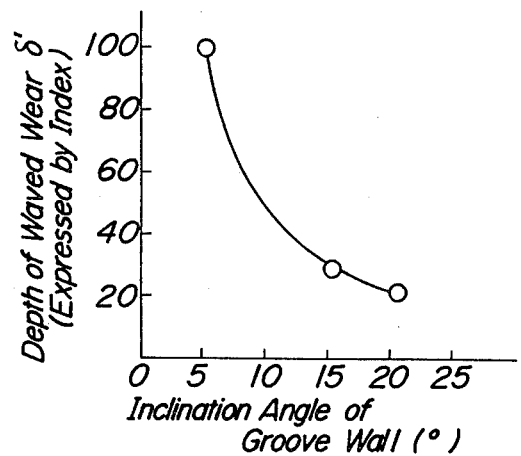
FIG. 7
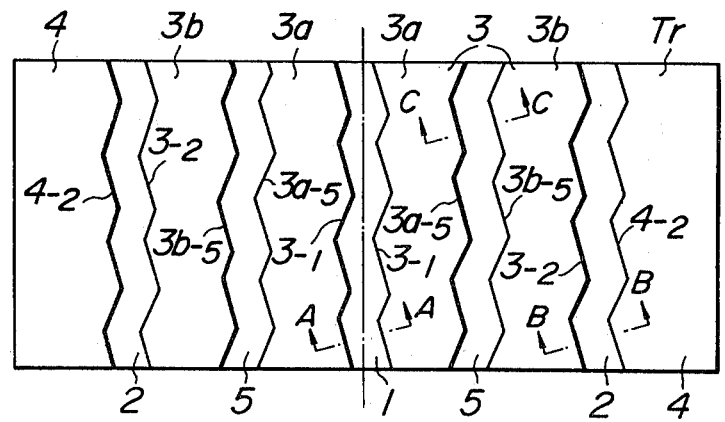
FIG. 8
FIG. 9a
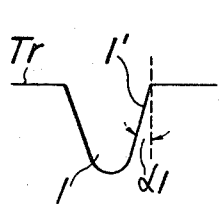
FIG. 9b
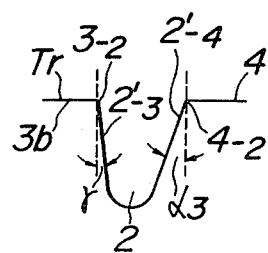
FIG. 9c
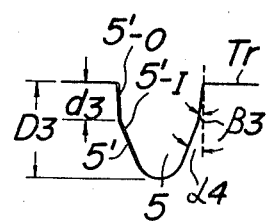

HEAVY DUTY PNEUMATIC RADIAL TIRES

BACKGROUND OF THE INVENTION

This invention relates to heavy duty pneumatic radial tires, and more particularly to an improvement of tread groove shape in the tire of this type suitable for use in heavy vehicles such as truck, bus and the like running not only on good roads at high speed but also on bad road inclusive of general unpaved road and construction sites.

In general, radial tires using metal cords as a belt reinforcement have several merits such as wear resistance, puncture resistance and the like as compared with the usual bias tires. This is because a stiff belt is disposed between the tread rubber and the carcass ply, but are poor inride feeling due to the rigid reinforcing effect with the belt. Therefore, the development of such radial tires are particularly advanced for use on good roads aside from bad roads. Lately, the demand for these tires is conspicuous with the remarkable improvement of road situations such as the development of expressway networks and the like.

Considering the traction and braking performances as well as general wear resistance and resistance to heat buildup for such applications, the tread of the tire is provided with circumferential ribs defined by main zigzag grooves extending in the circumferential direction of tire, which is generally called as a rib-type tread pattern. Although such ribs are usually continuous in the circumferential direction of tire, there are some cases that the rib is further provided therein with a fine groove extending in the circumferential direction and that the rib is discontinuous in the circumferential direction by separating with transverse grooves arranged along the widthwise direction of tire. In any case, peculiar abnormal wears occur in the rib when continuously running over a long distance at a high running speed.

One of these abnormal wears is mainly a so-called railway wear, which starts from a side edge portion of a circumferential rib 3 defined by tread grooves 1, 2 of a tire T and gradually spreads in the circumferential direction over a region with a stepwise difference $\delta$ and a width w as shown in FIG. 1 when the tire goes on road continuously straight. Another of the abnormal wears is mainly a so-called waved wear, which starts from an outer side edge portion of an outermost circumferential rib 4 viewing from the axial direction of tire T and discontinuously produces a stepwise $\delta'$ along the circumferential direction of tire to locally wear the rib 4 as shown in FIG. 2 when the tire is affected by cornering.

These abnormal wear patterns not only render the appearance of the tire T awkward, but also adversely affect tire performance, particularly traction performance, braking performance and cornering performance, which largely reduce the tire life.

Moreover, the vehicles provided with tires for use on a good road surface are obliged to run on a bad road surface locally included in such a good road. For instance, it is indispensable to drive trucks or the like into construction sites, so that there are many chances of picking up foreign matter such as stones scattered on road surface or the like by tread grooves.

In the heavy duty pneumatic radial tire, the movement of tread is suppressed at its ground contact area by the stiff tread reinforcement as mentioned above, so that such tires are apt to cause stone pick-up and if caused, the picked stones are strongly retained within the grooves and are difficult to be discharged therefrom. As a result, the retained stone repeatedly strikes on the base rubber above the tread reinforcement or the belt at the bottom of the circumferential groove every the tire rotation, which produces the breaking of the base rubber and hence the internal damage of the reinforcement structure. Particularly, when the belt is composed of metal cords, rust corrosion is caused by the penetration of water from the damaged portion of the base rubber to separate the cords from rubber, and finally fatal damage may be produced in the durable use life of tire inclusive of tire retreading.

Heretofore, there have been various attempts for individually solving the aforementioned two drawbacks, i.e. the occurrence of abnormal wears and the problem of stone pick-up, but these drawbacks cannot simultaneously be solved by such attempts because all cross-sectional shapes of the circumferential grooves are set substantially same in these attempts.

Alternatively, as disclosed in U.S. Pat. No. 3,763,911, the cross-sectional shape of the circumferential groove adjacent to the center rib is made so that the width of the center rib gradually reduces inward in the radial direction of tire and a protrusion is disposed on the groove bottom independently of the rib, whereby it is attempted to reduce the railway wear and at the same time prevent the stone pick-up in these circumferential grooves. In this case, however, the shape of the groove becomes complicated and is difficult in its formation, and also the above drawbacks are not effectively solved as an overall surface of the tread.

It is, therefore, an object of the invention to provide tires which can simultaneously solve the above two problems of two kinds of abnormal wear and stone pick-up, which are unavoidable in the tire used on good road surfaces including bad road surfaces, over a whole contact area of tread advantageously, simply and effectively, i.e. tires capable of realizing uniform wear over the whole contact area of the tread and reduction of total stone pick-up number.

The inventors have found the following in connection with a tread pattern as shown in FIG. 3:

(1) When an inclination angle of a groove wall in all of tread main grooves 1, 2 with respect to a normal line drawn from the outer surface of the tread and passing each edge of the grooves is set relatively large, railway wear is particularly apt to occur in an outer edge portion $3_{-2}$ of a circumferential rib 3 during the running on good road; and (2) When the inclination angle of the groove wall in all main grooves 1, 2 is set relatively small, waved wear is apt to occur in an outermost rib 4 during the running on good road, while the stone pick-up is apt to occur in the tread main grooves 1, 2 during the running on bad road and also the degree of stone pick-up is large in the tread main groove 1 located at the center portion of the tread.

On the basis of the above facts, the inventors have aimed at such a point that abnormal wears such as railway wear, waved wear and the like and stone pick-up are apt to occur in different positions of the tread. It has been confirmed that the aforementioned problems are simultaneously solved by taking the shape of the groove suitable for preventing the occurrence of individual problem in each position, whereby it is made possible to provide tires advantageously adaptable for use on both good and bad roads.

According to the invention, there is the provision of in a heavy duty pneumatic radial tire comprising a carcass of a substantially radial construction composed of at least one rubberized ply layer containing cords embedded therein and a belt superimposed about said carcass for stiff reinforcement beneath a tread and composed of at least two rubberized ply layers each containing metal cords embedded therein, said metal cords of which being crossed with each other at a relatively small angle with respect to the circumferential direction of tire, and said tread being provided with a plurality of continuous or discontinuous zigzag circumferential ribs defined along the widthwise direction of tire by at least three, substantially zigzag main grooves extending circumferentially of said tread, said main grooves comprising one or a pair of central circumferential grooves located at a substantially central region of said tread and a pair of outside circumferential grooves defining each of outermost ribs of said tread, the improvement wherein said central circumferential groove has such a symmetrical cross-sectional shape with respect to a center line of said groove that an inclination angle of a groove wall of said groove with respect to a normal line drawn from an outer surface of said tread and passing an edge of said groove in the cross section perpendicular to said groove wall is made relatively large in a region extending from the groove bottom to at least 50% of groove depth, and said outside circumferential groove has such an unsymmetrical cross-sectional shape with respect to a center line of said groove that an inclination angle of an outer groove wall of said groove in the rotation axial direction of tire is made relatively large and an inclination angle of an inner groove wall of said groove in a region extending from the outer surface of said tread to at least 10% of groove depth is made smaller than that of said outer groove wall.

According to one embodiment of the invention, the tread is divided into a plurality of continuous or discontinuous zigzag circumferential ribs along the widthwise direction of tire by at least five, substantially zigzag main grooves extending circumferentially of the tread, and these main grooves comprises one or a pair of central circumferential grooves located at a substantially central region of the tread, a pair of outside circumferential grooves defining each of outermost ribs of the tread and at least a pair of middle circumferential grooves each arranged between the central circumferential groove and the outside circumferential groove. In this case, the middle circumferential groove preferably has such a symmetrical cross-sectional shape with respect to a center line of the groove that the groove wall is a substantially polygonal line wherein an inclination angle of a radially inner portion of the groove wall is larger than that of a radially outer portion of the groove wall.

BRIEF DESCRIPTION OF THE DRAWINGS

The invention will now be described in detail with reference to the accompanying drawings, wherein:

FIG. 7 is a graph showing a relation between the inclination angle of the groove wall and the depth of waved wear;

FIG. 8 is a plan view of another embodiment of the tread pattern in the tire according to the invention; and FIGS. 9a, 9b and 9c are schematically cross-sectional views of tread grooves taken along lines A—A, B—B and C—C, of FIG. 8 respectively.

DESCRIPTION OF THE PREFERRED EMBODIMENTS

Figure 3:
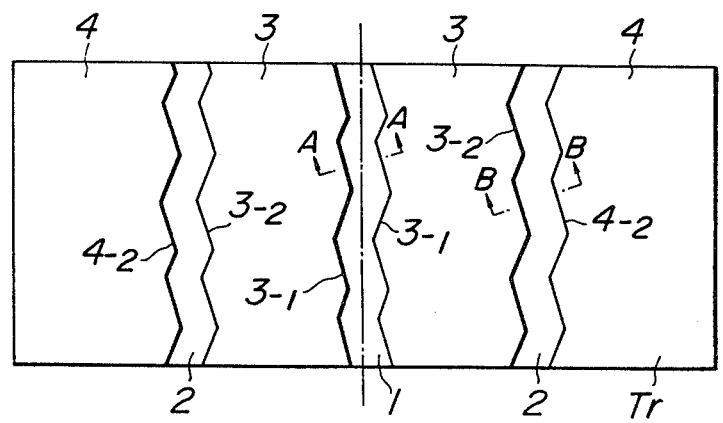
FIG. 3 is a plan view of an embodiment of the tread pattern in the tire according to the invention.

According to the invention, the tread pattern of the tire itself is substantially the same as in the conventional tires, a typical example of which is shown in FIG. 3. In this case, a tread Tr comprises a central circumferential groove 1 (or a pair of the central circumferential grooves, not shown) located at a central region of the tread Tr and a pair of outside circumferential grooves 2, 2 defining circumferential ribs 3, 3 together with the central circumferential groove 1 and outermost circumferential ribs 4, 4 in the tread Tr. If necessary, each of the circumferential ribs 3, 4 may be provided with at least one narrow groove having a width corresponding to not more than about 2% of the tread width and extending circumferentially of the tread, or may be separated into blocks by transverse grooves.

Figure 4A:
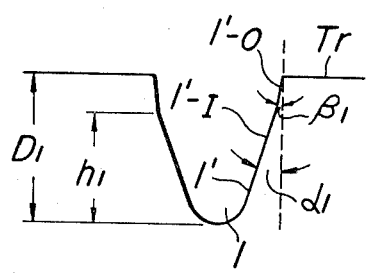
FIGS. 4a and 4b are schematically cross-sectional views of tread grooves taken along lines A—A and B—B of FIG. 3, respectively.
Figure 4B:
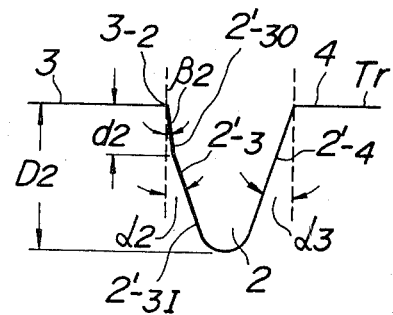

In the tire according to the invention, each of the circumferential grooves 1, 2 has a cross-sectional shape as shown in FIGS. 4a and 4b by taking along lines A—A and B—B of FIG. 3 in a direction perpendicular to the groove wall.

FIG. 4a shows the cross-sectional shape of the central circumferential groove 1, wherein a wall 1' of the groove 1 is inclined at an acute angle with respect to a normal line drawn from an outer surface of the tread Tr and passing the edge of the groove (shown by a dotted line) and is symmetrical right and left with respect to a center line of the groove. In this case, an inclination angle $\alpha_1$ of the groove wall 1' in a region $1'_I$ of a height $h_1$ extending from the groove bottom to at least 50% of groove depth $D_1$ is relatively larger than that of the commonly used tread groove.

In the central circumferential groove 1, the stone pick-up is apt to occur during the running on bad road, so that the inclination angle $\alpha_1$ of the groove wall 1' in at least a region $1'_I$ is made relatively large in order to prevent stone pick-up. For this purpose, the inclination angle $\alpha_1$ is preferably 14°–24°, more particularly 17°–21°.

Moreover, the inclination angle of the groove wall 1 is defined at a normal internal pressure under no load as described above. This definition is also applied to the other circumferential grooves.

Figure 5:
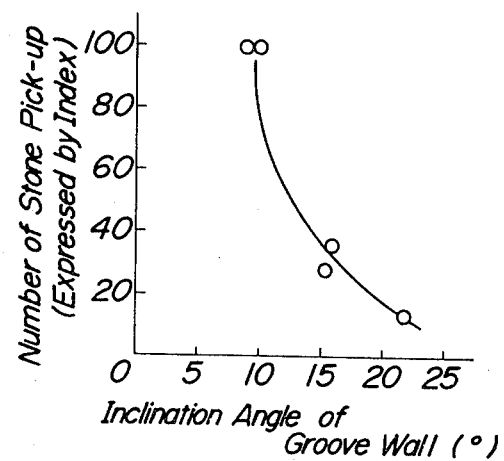
FIG. 5 is a graph showing a relation between the inclination angle of the groove wall and the number of stone pick-up.

A practical test against stone pick-up was made by running a tire having a size of 10.00 R20 on bad road at a speed of 30 km/hr to obtain a result as shown in FIG. 5. As apparent from FIG. 5, when the inclination angle of the groove wall 1' is not less than 14°, the effect of preventing the stone pick-up becomes remarkable, so that the inclination angle $\alpha_1$ in the region $1'_I$ of the groove wall is preferable to be not less than 14°. On the other hand, when the inclination angle is more than 24°, there is a possibility of causing the railway wear even in the central circumferential groove, so that the upper limit of the inclination angle should be 24°. The optimum range of the inclination angle is 17°-21°.

In the central circumferential groove 1, the reason why the height $h_1$ of the region $1'_I$ is limited to at least 50% of the groove depth $D_1$ is due to the fact that when the height $h_1$ is less than 50%, the effect of preventing the stone pick-up cannot be developed. Moreover, the height $h_1$ may be properly selected from the range of at least 50%, preferably not less than 65% of the groove depth $D_1$ in accordance with a running ratio of a good road to a bad road in the vehicle to be used.

When the ratio of running on bad road is fairly high, the central circumferential groove has a small tendency of causing the railway wear but a large tendency of causing the stone pick-up. In this case, therefore, it is preferable that the groove wall of the central circumferential groove 1 is a substantially straight line at a relatively large inclination angle over a whole region in cross section of the groove though the cross-sectional shape of the groove is not shown in the drawing. As the ratio of running on good road increases, the occurrence of railway wear cannot be ignored even in the central circumferential groove. In this case, it is favorable that the groove wall of the central circumferential groove 1 is a substantially polygonal line having two inclination angles wherein an inclination angle $\beta_1$ of a radially outer portion $1'_O$ of the groove wall $1'$ is smaller than an inclination angle $\alpha_1$ of a radially inner portion $1'_I$ (corresponding to the above region $1'_I$) as shown in FIG. 4a. When the groove wall is such a substantially polygonal line, the inclination angle $\beta_1$ of the radially outer portion $1'_O$ is preferably 0°-10°, more particularly 4°-8° in view of the prevention of railway wear and other production conditions.

Figure 1:
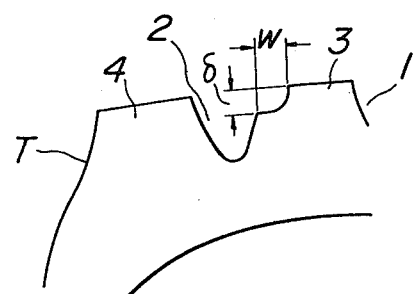
FIG. 1 is a partially radial section view of a tire illustrating the occurrence of railway wear.
Figure 6:
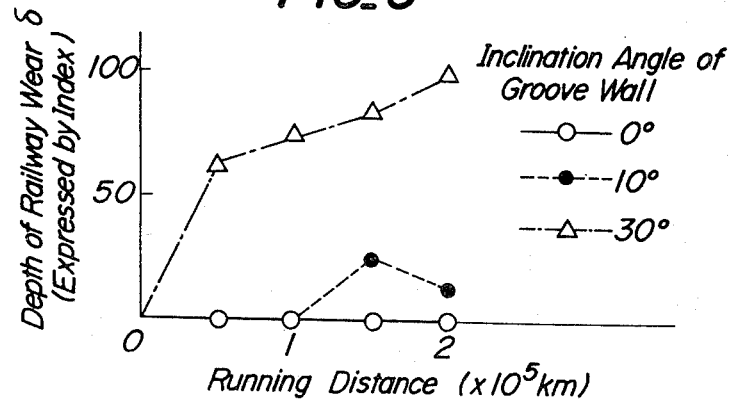
FIG. 6 is a graph showing a relation between the running distance and the depth of railway wear as a function of the inclination angle of the groove wall.

As regards the railway wear represented by the stepwise difference $\delta$ of FIG. 1, the continuous running test on good road was made with respect to test tires having different inclination angles of groove wall to obtain a result as shown in FIG. 6. As seen from FIG. 6, the railway wear reduces with the decrease of the inclination angle. Particularly, the inclination angle of not more than 10° considerably reduces the railway wear or has a remarkable effect of delaying the occurrence time of railway wear.

Thus, the height $h_1$ and inclination angle $\alpha_1$ of the region $1'_I$ and the inclination angle $\beta_1$ of the radially outer portion $1'_O$ in the central circumferential groove 1 are properly selected from the above defined ranges in accordance with the running ratio of a good road to a bad road. For instance, they may be selected smaller within the above ranges as the ratio of running on good road increases.

FIG. 4b shows the cross-sectional shape of the outside circumferential groove 2, wherein a groove wall $2'_4$ facing the outermost rib 4 in the rotation axial direction of tire has an inclination angle $\alpha_3$, which is relatively larger than that of the commonly used tread groove as described on the inclination angle $\alpha_1$ of the central circumferential groove 1, while a groove wall $2'_3$ facing the inner rib 3 in the rotation axial direction of tire has an inclination angle $\beta_2$ in a region $2'_{30}$ of a depth $d_2$ extending from the outer surface of the tread Tr to at least 10% of groove depth $D_2$, which is smaller than the inclination angle $\alpha_3$, so that the groove walls $2'_3$ and $2'_4$ are unsymmetrical with respect to a center line of the groove.

In the outside circumferential groove 2, the railway wear is apt to occur in a rib edge $3_{-2}$ adjacent to the inner groove wall $2'_3$ and the waved wear is apt to occur in the outermost rib 4 adjacent to the groove wall $2'_4$ during the running on a good road. On the other hand, the occurrence of stone pick-up in the outside circumferential groove 2 during the running on a bad road is less than that in the central circumferential groove 1 but cannot yet be ignored. Considering all of these facts, the outside circumferential groove 2 takes the above defined groove shape.

Figure 2:
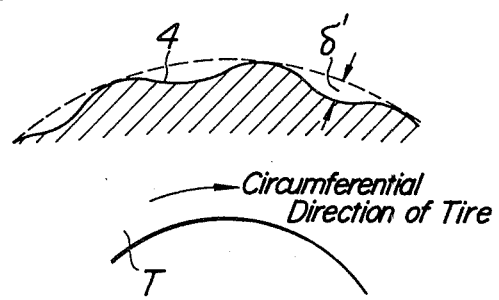
FIG. 2 is a partial schematic view of a tire illustrating an occurrence of waved wear viewing from an axial direction of tire.

The inclination angle $\alpha_3$ of the groove wall $2'_4$ is preferably 14°-24°, more particularly 17°-21° as described on inclination angle $\alpha_1$. Because, the stepwise difference $\delta'$ of waved wear produced in the outermost circumferential rib 4 as shown in FIG. 2 reduces with the increase of the inclination angle $\alpha_3$ in the outer groove wall $2'_4$ of the outside circumferential groove 2 as apparent from the results of stationary turning test shown in FIG. 7. When the inclination angle $\alpha_3$ is not more than 14°, the effect of reducing the waved wear becomes conspicuous, while when the inclination angle $\alpha_3$ exceeds 24°, there is a possibility that the occurrence of railway wear cannot be ignored. Considering these facts as well as the prevention of stone pick-up, the inclination angle $\alpha_3$ is preferably within the above defined range.

The inclination angle $\beta_2$ of the groove wall $2'_3$ in the region $2'_{30}$ extending from the outer surface of the tread to the depth $d_2$ is preferably not more than 17°. The inclination angle $\beta_2$ of less than 0° is not preferable because the production of tires is difficult and there is caused a risk of breaking off the rib edge $3_{-2}$. Particularly, the inclination angle $\beta_2$ is 0°-14°, and more particularly 0°-10° as described on the inclination angle $\beta_1$.

When the depth $d_2$ of the region $2'_{30}$ is less than 10% of the groove depth $D_2$, the effect of preventing the railway wear cannot be sufficiently developed. Therefore, the depth $d_2$ is properly selected within the range of at least 10%, preferably not less than 25% of the groove depth $D_2$ in accordance with the running ratio of good road to bad road. When the running on a bad road is extremely less, the groove wall $2'_3$ can be made a substantially straight line over its whole region at an inclination angle smaller than the inclination angle of the outer groove wall $2'_4$ considering only the railway wear. In general, it is necessary to consider the prevention of stone pick-up in the running on a bad road, so that it is preferable that the inner groove wall $2'_3$ is substantially polygonal line wherein an inclination angle $\alpha_2$ of a radially inner portion $2'_{3I}$ is larger than the inclination angle $\beta_2$ of the radially outer portion $2'_{30}$ as shown in FIG. 4b. In the latter case, the inclination angle $\alpha_2$ of the radially inner portion $2'_{3I}$ of the groove wall $2'_3$ is somewhat larger than the inclination angle of the commonly used tread groove, which is preferably 14°-24°, more particularly 17°-21°.

FIG. 8 shows another embodiment of the tread pattern in the tire according to the invention, wherein a pair of middle circumferential grooves 5 are further arranged between the central circumferential groove 1 having the groove shape shown in FIG. 4a and the outside circumferential groove 2 having the groove shape shown in FIG. 4b, respectively, whereby the circumferential rib 3 is divided into two ribs 3a and 3b.

In the embodiment of FIG. 8, the middle circumferential groove 5 is small in the stone pick-up and large in the railway wear as compared with the central circumferential groove 1 and is slightly large in the stone pick-up as compared with the outside circumferential groove 2, so that it is preferable to have a groove shape as shown in FIG. 9c considering the prevention of both the stone pick-up and railway wear.

That is, the middle circumferential groove 5 has a symmetrical cross-sectional shape with respect to a center line of the groove, wherein a groove wall 5' is such a substantially polygonal line that an inclination angle $\alpha_4$ of a radially inner portion $5'_{-I}$ of the groove wall 5' is larger than an inclination angle $\beta_3$ of a radially outer portion $5'_{-O}$. In this case, the inclination angle $\beta_3$ is preferably 0°–10°, more particularly 4°–8°, and the inclination angle $\alpha_4$ is preferably 14°–24°, more particularly 17°–21°. Moreover, a depth $d_3$ of the radially outer portion $5'_{-O}$ from the outer surface of the tread is preferably 5–50%, more particularly 20–40% of a groove depth $D_3$.

When the tread main grooves comprises at least five circumferential grooves as shown in FIG. 8, the central circumferential groove 1 is better to have a groove shape as shown in FIG. 9a wherein the height $h_1$ of the groove wall 1' is equal to the groove depth $D_1$ of the groove 1 because railway wear itself is absolutely small in the central portion of the tread and it is sufficient to take only stone pick-up into consideration.

Moreover, each of these main grooves according to the invention has a width corresponding to 3–10% of tread width of the tire.

The effect of the invention will be described in detail with reference to the following experiment.

Several heavy duty pneumatic radial tires having a size of 10.00 R20 are provided, each of which comprises a carcass of a substantially radial construction composed of at least one rubberized ply layer containing cords embedded therein and a belt superimposed about the carcass for stiff reinforcement beneath a tread and composed of at least two rubberized ply layers each containing metal cords embedded therein, the metal cords of which being crossed with each other at a relatively small angle with respect to the circumferential direction of tire. Among them, a tire A according to the invention has a tread pattern provided with four circumferential ribs having substantially the same width defined along the widthwise direction of tire by three circumferential tread main grooves as shown in FIG. 3, wherein the central circumferential groove 1 and outside circumferential groove 2 have the groove shapes as shown in FIGS. 4a and 4b, respectively. In this case, the inclination angles $\alpha_1$, $\alpha_2$, $\alpha_3$, $\beta_1$ and $\beta_2$ and the ratios $h_1/D_1$ and $d_2/D_2$ are 20°, 20°, 20°, 7°, 7°, 80% and 30%, respectively.

Tires C and D according to the invention have a tread pattern provided with six circumferential ribs having substantially the same width defined along the widthwise direction of tire by five circumferential tread main grooves as shown in FIG. 8. In the tire C, the groove shapes of the central circumferential groove 1 and the outside circumferential groove 2 are the same as in the tire A and the middle circumferential groove 5 has a groove shape as shown in FIG. 9c wherein the inclination angles $\alpha_4$, $\beta_3$ and the ratio $d_3/D_3$ are 20°, 7° and 30%, respectively. In the tire D, the central circumferential groove 1, outside circumferential groove 2 and middle circumferential groove 5 have groove shapes as shown in FIGS. 9a, 9b and 9c, respectively. In this case, the inclination angles $\alpha_1$, $\alpha_3$, $\alpha_4$, $\beta_3$, $\gamma$ and the ratios $h_1/D_1$ and $d_3/D_3$ are 18°, 20°, 20°, 7°, 13°, 100% and 30%, respectively.

On the other hand, a control tire B has the same structure as in the tire A except that the groove walls of the tread main grooves 1 and 2 are substantially straight lines, respectively and the inclination angle of each of these grooves is 13°, while a control tire E has the same structure as in the tire C except that the groove walls of the tread main grooves 1, 2 and 5 are substantially straight lines, respectively and the inclination angle of each of these grooves is 13°.

After each of these test tires is run on road under an internal pressure of 7.25 kg/cm² and a normal load over a distance of 20,000 km (good road: 90%, speed: 60 km/hr; bad road: 10%, speed: 30 km/hr), the number of stone pick-up, depth of railway wear (stepwise difference $\delta$) and depth of waved wear (stepwise difference $\delta'$) are measured to obtain results as shown in the following table.

In this table, numerical values are expressed by an index on the basis that the control tire is 100.

TABLE

| | | Tire A | Control tire B | Tire C | Tire D | Control tire E |
|---|---|---|---|---|---|---|
| Number of stone pick-up | Central circumferential groove 1 | 79 | 100 | 83 | 53 | 100 |
| | Middle circumferential groove 5 | | | 81 | 78 | 100 |
| | Outside circumferential groove 2 | 63 | 100 | 70 | 70 | 100 |
| Depth of railway wear, (stepwise difference $\delta$) | Inner edge $3_{-1}$ of circumferential rib 3 | 48 | 100 | 52 | 119 | 100 |
| | Outer edge $3a_{-5}$ of circumferential rib 3a | | | 48 | 50 | 100 |
| | Inner edge $3b_{-5}$ of circumferential rib 3b | | | 55 | 54 | 100 |
| | Outer edge $3_{-2}$ of circumferential rib 3 | 60 | 100 | 61 | 92 | 100 |
| Depth of waved wear (stepwise difference $\delta'$) | Circumferential rib 4 | 64 | 100 | 61 | 60 | 100 |

As apparent from the results of the above table, the tires according to the invention can advantageously and effectively prevent the abnormal wears and stone pick-up over substantially a whole contact area of the tread as compared with the control tires. In the tire D, the depth of railway wear at the inner edge $3_{-1}$ of the circumferential rib 3 is somewhat larger than that of the control tire E, but such an increase can be ignored because the absolute depth of railway wear itself is very small in this edge portion.

According to the invention, the abnormal wears and stone pick-up in the heavy duty pneumatic radial tire obliged to run on good and bad roads can simultaneously and effectively be prevented as compared with the conventional tires.

What is claimed is:

1. A heavy duty pneumatic radial tire comprising; a carcass of a substantially radial construction composed of at least one rubberized ply layer containing cords embedded therein and a belt superimposed about said carcass for stiff reinforcement beneath a tread and composed of at least two rubberized ply layers each containing metal cords embedded therein, said metal cords of which being crossed with each other at a relatively small angle with respect to the circumferential direction of tire, and said tread being provided with a plurality of continuous or discontinuous zigzag circumferential ribs defined along the widthwise direction of tire by at least three, substantially zigzag main grooves extending circumferentially of said tread, said main grooves comprising one or a pair of central circumferential grooves located at a substantially central region of said tread and a pair of outside circumferential grooves defining each of outermost ribs of said tread, said central circumferential groove has such as symmetrical cross-sectional shape with respect to a center line of said groove that an inclination angle of a groove wall of said groove with respect to a normal line drawn from an outer surface of said tread and passing an edge of said groove in the cross section perpendicular to said groove wall is 14°–24° in a region extending from the groove bottom to at least 50% of groove depth, said outside circumferential groove has such an unsymmetrical cross-sectional shape with respect to a center line of said groove that an inclination angle of an outer groove wall of said groove in the rotation axial direction of tire is 14°–24° and an inclination angle of an inner groove wall of said groove in a region extending from the outer surface of said tread to at least 10% of groove depth is made smaller than that of said outer groove wall.

2. A tire according to claim 1, wherein said tread is provided with at least five, substantially zigzag main grooves extending circumferentially of said tread, said main grooves comprising one or a pair of central circumferential grooves located at a substantially central region of said tread, a pair of outside circumferential grooves defining each of outermost ribs of said tread and at least a pair of middle circumferential grooves each arranged between said central circumferential groove and said outside circumferential groove.

3. A tire according to claim 1 or 2, wherein said inclination angle of the inner groove wall of the outside circumferential groove is 0°–17° in said region extending from the outer surface of the tread to at least 10% of the groove depth.

4. A tire according to claim 3, wherein said inclination angle is 0°–14°.

5. A tire according to claim 1 or 2, wherein said groove wall of the central circumferential groove is a substantially straight line at a relatively large inclination angle over a whole region in cross section of the groove.

6. A tire according to claim 1 or 2, wherein said groove wall of the central circumferential groove is a substantially polygonal line in which an inclination angle of a radially outer portion of the groove wall is smaller than that of a radially inner portion thereof.

7. A tire according to claim 6, wherein said inclination angle of the radially outer portion is 0°–10°.

8. A tire according to claim 1 or 2, wherein said inner groove wall of the outside circumferential groove is a substantially polygonal line in which an inclination angle of a radially outer portion of the inner groove wall is smaller than that of a radially inner portion thereof.

9. A tire according to claim 8, wherein said inclination angle of the radially inner portion is 14°–24°.

10. A tire according to claim 1 or 2, wherein said inner and outer groove walls of the outside circumferential groove are a substantially straight line over a whole region in cross section of the groove in which an inclination angle of an inner groove wall is smaller than that of an outer groove wall.

11. A tire according to claim 2, wherein said middle circumferential groove has such a symmetrical cross-sectional shape with respect to a center line of the groove that a groove wall of said groove is a substantially polygonal line in which an inclination angle of a radially outer portion of the groove wall is smaller than that of a radially inner portion thereof.

12. A tire according to claim 11, wherein said inclination angle of the radially inner portion is 14°–24°.

13. A tire according to claim 11, wherein said inclination angle of the radially outer portion is 0°–10°.

14. A tire according to claim 11, wherein said radially outer portion of the middle circumferential groove extends from the outer surface of said tread to 5–50% of groove depth.

* * * * *